United States Patent
Xia et al.

(10) Patent No.: US 11,485,661 B2
(45) Date of Patent: Nov. 1, 2022

(54) DEVICE FOR ADVANCED DEGRADATION OF ORGANIC WASTEWATER AND APPLICATION THEREOF

(71) Applicant: ZHEJIANG GONGSHANG UNIVERSITY, Hangzhou (CN)

(72) Inventors: Yijing Xia, Hangzhou (CN); Huajun Feng, Hangzhou (CN); Ling Ye, Hangzhou (CN); Xiangjuan Ma, Hangzhou (CN); Jihua Dai, Hangzhou (CN); Yan Yan, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/746,947

(22) Filed: May 17, 2022

(65) Prior Publication Data
US 2022/0274857 A1    Sep. 1, 2022

(30) Foreign Application Priority Data
Jun. 21, 2021    (CN) .......................... 202110688376.6

(51) Int. Cl.
*C02F 9/00*    (2006.01)
*B01D 24/16*    (2006.01)
(Continued)

(52) U.S. Cl.
CPC ................ *C02F 9/00* (2013.01); *B01D 24/16* (2013.01); *C25D 9/06* (2013.01); *C25D 13/04* (2013.01); *C25D 13/14* (2013.01); *C25D 13/20* (2013.01); *B01D 2101/00* (2013.01); *C02F 1/004* (2013.01); *C02F 1/4672* (2013.01); *C02F 1/46114* (2013.01); *C02F 2001/46142* (2013.01); *C02F 2001/46166* (2013.01); *C02F 2001/46171* (2013.01);
(Continued)

(58) Field of Classification Search
None
See application file for complete search history.

(56) References Cited

U.S. PATENT DOCUMENTS
6,126,838 A    10/2000    Huang et al.

FOREIGN PATENT DOCUMENTS
CA    2077787 A1    11/1993
CN    1522968 A    8/2004
(Continued)

*Primary Examiner* — Magali P Slawski
*Assistant Examiner* — Brad Gordon

(57) ABSTRACT

A three-dimensional electrode-ozone oxidation-electrocatalytic membrane coupled wastewater treatment device, including a circulating fluidized bed reactor. The circulating fluidized bed reactor includes a funnel-shaped internal, a truncated cone, a fiber ball filter, a gas-liquid distribution plate, an inner cylinder, an intermediate cylinder and an outer cylinder. The inner cylinder, the intermediate cylinder and the outer cylinder are coaxial. The inner cylinder is an electrocatalytic membrane assembly; the intermediate cylinder is a gas diffusion electrode; and the outer cylinder is a stainless-steel mesh. A particle electrode is filled between the intermediate cylinder and the outer cylinder, and between the intermediate cylinder and the inner cylinder. The intermediate cylinder is connected to a negative electrode. The inner cylinder and the outer cylinder are connected to a positive electrode. A wastewater treatment method using the device is also provided herein.

18 Claims, 3 Drawing Sheets

(51) Int. Cl.
*C02F 1/00* (2006.01)
*C02F 101/30* (2006.01)
*C25D 13/04* (2006.01)
*C25D 13/14* (2006.01)
*C25D 13/20* (2006.01)
*C25D 9/06* (2006.01)
*C02F 1/461* (2006.01)
*C02F 1/467* (2006.01)

(52) U.S. Cl.
CPC .. *C02F 2101/30* (2013.01); *C02F 2201/4619* (2013.01); *C02F 2201/46115* (2013.01); *C02F 2201/782* (2013.01); *C02F 2209/235* (2013.01); *C02F 2209/38* (2013.01); *C02F 2301/063* (2013.01); *C02F 2301/08* (2013.01)

(56) References Cited

FOREIGN PATENT DOCUMENTS

| | | | |
|---|---|---|---|
| CN | 1654340 | A | 8/2005 |
| CN | 102260023 | A | 11/2011 |
| CN | 102976451 | A | 3/2013 |
| CN | 103769007 | A | 5/2014 |
| CN | 104326530 | A | 2/2015 |
| CN | 105621540 | A | 6/2016 |
| CN | 205953613 | U | 2/2017 |
| CN | 107117690 | A | 9/2017 |
| CN | 107473337 | A | 12/2017 |
| CN | 111039363 | A | 4/2020 |
| CN | 111087050 | A | 5/2020 |
| CN | 111825200 | A | 10/2020 |
| CN | 112777818 | A | 5/2021 |

US 11,485,661 B2

DEVICE FOR ADVANCED DEGRADATION OF ORGANIC WASTEWATER AND APPLICATION THEREOF

CROSS-REFERENCE TO RELATED APPLICATIONS

This application claims the benefit of priority from Chinese Patent Application No. 202110688376.6, filed on Jun. 21, 2021. The content of the aforementioned application, including any intervening amendments thereto, is incorporated herein by reference in its entirety.

TECHNICAL FIELD

This application relates to organic wastewater treatment, and more specifically to a wastewater treatment device and process based on the coupling of three-dimensional electrode-ozone oxidation-electrocatalytic membrane using a circulating fluidized bed.

BACKGROUND

Organic pollutants in the wastewater will seriously threaten the ecological environment and public health since most of them cannot be effectively removed by a traditional biological wastewater treatment system before delivered to an aquatic ecosystem and a drinking water plant. Therefore, the wastewater must be treated reasonably and effectively before the discharge. Currently, the organic pollutants in wastewater are commonly treated by membrane technology, adsorption, advanced oxidation and photocatalysis.

Advanced oxidation process, emerging at the end of the $20^{th}$ century, has been a predominant tool for the water treatment, including electrocatalytic oxidation, ozone oxidation, Fenton oxidation and sonochemical oxidation. Particularly, the combination of electrocatalysis oxidation and ozone oxidation can promote the complete degradation of organic pollutants, and moreover, it has rapid oxidation, desirable mineralization effect and short contact time, and thus has attracted more and more attention.

Unfortunately, the existing electrocatalytic-ozonation coupled reactors struggle with poor mass transfer, and the $O_3$ utilization rate and $H_2O_2$ generation rate are still unsatisfactory. Theoretically, the reaction efficiency between $O_3$ and pollutants or $H_2O_2$ is limited by the dissolution rate and residence time of $O_3$, and the gas-liquid mass transfer efficiency.

Chinese Patent Publication No. 111825200 A discloses a catalytic ozonation fluidized bed device and a method for treating biorefractory organic wastewater using the same. Specifically, by means of the multi-polar three-electrode pasting technology, common metal oxides such as $MnO_2$, $CuO$, $Fe_2O_3$ and a combination thereof are supported on $\gamma$-$Al_2O_3$ to constitute a multi-polar particle electrode, which further constitutes a multi-polar three-electrode coupled reactor with a conductive carbon fiber cathode and a carbon felt anode. Coupled with the ozone-enhanced catalytic oxidation, the effective degradation of the organic pollutants in the biorefractory organic wastewater and the improvement of the biodegradability of the organic wastewater are enabled, and finally the post-treated water is separated through the hollow fiber membrane. However, the $O_3$ utilization rate and $H_2O_2$ generation rate are still not high enough, and the treatment rate and efficiency of the organic wastewater still need to be further improved.

SUMMARY

In order to overcome the above deficiencies of the prior art, the present disclosure provides a wastewater treatment device and process based on the coupling of three-dimensional electrode-ozone oxidation-electrocatalytic membrane using a fluidized bed.

The technical solutions of the present disclosure are described as follows.

In a first aspect, this application provides a device for advanced degradation of organic wastewater, comprising:

a fluidized bed reactor;

wherein the fluidized bed reactor is a cylindrical internally-circulating fluidized bed reactor; an interior of the fluidized bed reactor comprises a funnel-shaped internal, a truncated cone, a fiber ball filter, a gas-liquid distribution plate, an inner cylinder, an intermediate cylinder and an outer cylinder; and the inner cylinder, the intermediate cylinder and the outer cylinder are coaxial;

the intermediate cylinder is sleeved outside the inner cylinder, and the outer cylinder is sleeved outside the intermediate cylinder; the inner cylinder is an electrocatalytic membrane assembly; the intermediate cylinder is a gas diffusion electrode; the outer cylinder is a stainless-steel mesh; a first cavity is formed between the intermediate cylinder and the outer cylinder; a second cavity is formed between the intermediate cylinder and the inner cylinder; the first cavity and the second cavity are filled with a particle electrode; the intermediate cylinder is connected to a negative electrode; the inner cylinder and the outer cylinder are connected to a positive electrode; the intermediate cylinder and the outer cylinder are of equal height; tops of the inner cylinder, the intermediate cylinder and the outer cylinder are the same in height; bottoms of the intermediate cylinder and the outer cylinder are 1-3 cm lower than a bottom of the inner cylinder; and the outer cylinder is close to an outer wall of the fluidized bed reactor;

the fiber ball filter is arranged at a bottom of the fluidized bed reactor; the gas-liquid distribution plate is arranged on a top of the fiber ball filter; the inner cylinder, the intermediate cylinder and the outer cylinder are arranged at a top of the gas-liquid distribution plate; and the organic wastewater is allowed to flow through the fiber ball filter, the gas-liquid distribution plate, the first cavity, the second cavity and the inner cylinder sequentially to be discharged;

the funnel-shaped internal is arranged at the tops of the inner cylinder, the intermediate cylinder and the outer cylinder; a diameter of a lower orifice of the funnel-shaped internal is equal to a cross-sectional diameter of the inner cylinder; a ring width of a ring-shaped top of the funnel-shaped internal is equal to a distance between the intermediate cylinder and the outer cylinder; a vertical distance between the top of the funnel-shaped internal and the tops of the intermediate cylinder and the outer cylinder is 3-6 cm; a horizontal inclination angle a of the funnel-shaped internal is 120-150°; and the funnel-shaped internal is configured such that after entering the first cavity and flowing upward to reach the funnel-shaped internal, the organic wastewater is allowed to flow downward to enter the second cavity to form a circulating flow; and the truncated cone is arranged at bottoms of the inner cylinder, the intermediate cylinder and the outer cylinder; an upper surface of the truncated cone is connected with the bottom of the inner cylinder, and is the same with the bottom of the inner cylinder in area; a boundary of the upper surface of the truncated cone is vertically aligned with a boundary of the bottom of the inner cylinder; a lower surface of the truncated cone is the same with a bottom of the intermediate cylinder in area, and a boundary of the lower surface of the truncated cone is vertically aligned with a boundary of the intermediate cylinder; the gas-liquid distribution plate is provided at an outer side of a bottom of the truncated cone; and the truncated cone is configured such that after passing through fiber ball filter, the organic wastewater is allowed to enter the outer cylinder and the intermediate cylinder through the gas-liquid distribution plate.

In an embodiment, the gas-liquid distribution plate comprises a gas distributor, a plurality of gas channels and a plurality of liquid channels; the plurality of gas channels and the plurality of liquid channels are staggered; each of the plurality of gas channels is provided with a microporous aeration plate; each of the plurality of liquid channels is provided with a water distributing plate with a pore size of 0.1-0.5 mm; the gas distributor is communicated with the plurality of gas channels; and the gas distributor is configured for distributing a gas flowing toward the outer cylinder and the intermediate cylinder with an $O_3/O_2$ mixture.

In an embodiment, a length of the inner cylinder, the intermediate cylinder and the outer cylinder is 20-40 cm; and a distance between the positive and the negative electrode is 3-6 cm.

In an embodiment, the gas diffusion electrode is composed of a $Fe_3O_4$-doped active carbon, acetylene black and poly tetra fluoroethylene (PTFE); and a weight ratio of the $Fe_3O_4$-doped active carbon to the acetylene black to the PTFE is (77-82):(7-12):(9-15).

In an embodiment, a top of the inner cylinder is connected with a water outlet; the inner cylinder comprises a cylindrical water-permeable separator and a cylindrical porous Ti/polyaniline (PANI)/$PbO_2$ membrane electrode; wherein the cylindrical water-permeable separator is wrapped around the cylindrical porous Ti/PANI/$PbO_2$ membrane electrode.

In an embodiment, the cylindrical water-permeable separator has a pore size of 0.1-0.5 mm; a lower end of the cylindrical water-permeable separator is flush with a lower end of the cylindrical porous Ti/PANI/$PbO_2$ membrane electrode; an upper end of the cylindrical water-permeable separator is higher than an upper end of the cylindrical porous Ti/PANI/$PbO_2$ membrane electrode and a lowest point of the funnel-shaped internal; and a distance between the upper end of the cylindrical water-permeable separator and the lowest point of the funnel-shaped internal is less than 1 cm.

In an embodiment, the cylindrical porous Ti/PANI/$PbO_2$ membrane electrode comprises a porous Ti substrate, a polyaniline membrane transition layer, an $\alpha$-$PbO_2$ intermediate layer and a $\beta$-$PbO_2$ active layer.

In an embodiment, the cylindrical porous Ti/PANI/$PbO_2$ membrane electrode is prepared through steps of:

(a) cutting a cylindrical Ti substrate followed by grinding, polishing, degreasing with a NaOH solution, and etching with an oxalic acid solution to obtain the porous Ti substrate;

(b) performing deposition in an aniline-sulfuric acid solution at a constant voltage of 15-20 V for 15-45 min with the porous Ti substrate as anode and a titanium sheet as cathode to obtain a Ti/PANI electrode; wherein the aniline-sulfuric acid solution contains 0.1 mol/L aniline and 0.5 mol/L sulfuric acid;

(c) performing electrodeposition in an alkaline electroplating solution at a temperature of 50-65° C. and a current density of 3-5 mA/cm$^2$ for 0.5-2 h with the Ti/PANI electrode as anode and the titanium sheet as cathode to deposit the $\alpha$-$PbO_2$ intermediate layer, so as to obtain a Ti/PANI/$\alpha$-$PbO_2$ electrode; wherein the alkaline electroplating solution contains 0.1 mol/L PbO, 4-5 mol/L NaOH and water; and (d) performing electrodeposition in an acidic electroplating solution at a temperature of 50-90° C. and a current density of 10-80 mA/cm$^2$ for 0.5-1 h with the Ti/PANI/$\alpha$-$PbO_2$ electrode as anode and the titanium sheet as cathode to deposit the $\beta$-$PbO_2$ active layer, so as to obtain the cylindrical porous Ti/PANI/$PbO_2$ membrane electrode; wherein the acid electroplating solution is prepared by adjusting a mixture containing 0.3-0.5 mol/L $Pb(NO_3)_2$, 0.01-0.02 mol/L $KF.2H_2O$, 4-5 mL/L of 60 wt % PTFE emulsion and water to pH 1.5-2.0 with nitric acid.

In an embodiment, the porous Ti substrate is a tubular porous Ti substrate with a pore size of 100 μm-1 mm.

In an embodiment, the particle electrode is active carbon, graphite particle or super carbon black particle with an average particle size of 2-4 mm.

In an embodiment, a filling factor of the particle electrode in the fluidized bed reactor is 10-50%. In an embodiment, the fiber ball filter has a filtration rate of 0.5-2 cm/s; a specific surface area of greater than or equal to 2000 m$^2$/m$^3$, and a porosity of greater than or equal to 90%.

In an embodiment, the truncated cone has a height of 3-6 cm; and a horizontal inclination angle β of 30-45°.

In an embodiment, the device further comprises an inlet pipe, an inlet pump, a gas-liquid separator, an ozone generator, a first ozone collector, a second ozone collector, an outlet pump, an outlet pipe, an ozone detector, a gas flow meter and a valve.

In an embodiment, the ozone generator, the ozone detector, the gas flow meter, the valve and the gas-liquid distribution plate are connected in sequence; the inlet pipe is connected to the inlet pump; the inlet pump is connected to the bottom of the fluidized bed reactor through a first delivery pipe; a first end of the outlet pipe is communicated with the inner cylinder, and a second end of the outlet pipe is connected with the outlet pump; the outlet pump is communicated with the gas-liquid separator through a second delivery pipe; a top of the gas-liquid separator is connected with the second ozone collector through a third delivery pipe; and a bottom of the gas-liquid separator is provided with a water outlet.

In an embodiment, the gas diffusion electrode is prepared through steps of:

(a) subjecting a cylindrical stainless-steel substrate to soak in a NaOH solution with a mass fraction of 30-50% for 20-40 min followed by rinsing with deionized water;

subjecting the cylindrical stainless-steel substrate to soak in a $H_2SO_4$ solution with a mass fraction of 10-30% at 50-70° C. for 15-30 min followed by rinsing with deionized water; and etching the cylindrical stainless-steel substrate in an oxalic acid solution with a mass fraction of 10-30% at 70-90° C. for 1-3 h;

(b) weighing a desired amount of the $Fe_3O_4$-doped active carbon and the acetylene black into a beaker;

adding with a small amount of absolute ethanol and ultrasonically stirring to disperse evenly;

adding with a desired amount of 60% PTFE emulsion and continuously stirring an agglomerated paste in a constant temperature bath at 80-85° C.; and rolling, by a laminator, the agglomerated paste into two sheets with a thickness of 0.4-0.8 mm; wherein the weight ratio of the $Fe_3O_4$-doped active carbon to the acetylene black to the PTFE is (77-82):(7-12):(9-15); and (c) subjecting the two sheets to attach on an inner side and an outer side of the cylindrical stainless-steel substrate respectively and using a press with a certain pressure to control the two sheets attached on the stainless-steel substrate followed by drying in a drying cabinet at 100-120° C. for 0.5-1 h and calcinating in a muffle furnace at 300-350° C. for 1-1.5 h; and subjecting the gas diffusion electrode to soak in acetone for 18-24 h to remove the residual ethanol and organic impurities on a surface of the gas diffusion electrode followed by rinsing repeatedly with deionized water and drying for later use.

In an embodiment, the $Fe_3O_4$-doped active carbon is prepared through steps of:

dissolving a desired amount of $FeCl_3$ and $Fe_2SO_4$ in water followed by adding with the active carbon in proportion and stirring to blend evenly to obtain a mixed solution;

heating the mixed solution to 50-60° C. and adjusting the pH to weakly alkaline followed by stirring at a constant temperature for 1-3 h; and filtrating the mixed solution to obtain a filter cake followed by washing with deionized water and absolute ethanol in turn and drying in a vacuum oven, and grounding into powder; wherein a molar ratio of $FeCl_3$ to $Fe_2SO_4$ to active carbon is (2-5):(1.5-4):125.

In an embodiment, the first cavity is formed between the stainless-steel mesh and the gas diffusion electrode; the first cavity is a rising region; the second cavity is formed between the gas diffusion electrode and the electrocatalytic membrane assembly; and the second cavity is a descending region.

In a second aspect, this application provides a method for advanced treatment of organic wastewater based on a coupling of three-dimensional electrode-ozone oxidation-electrocatalytic membrane, comprising:

(a) filtering, by the fiber ball filter, the organic wastewater followed by delivery to the fluidized bed reactor through the plurality of liquid channels; feeding the $O_3/O_2$ mixture to the fluidized bed reactor through the plurality of gas channels by bottom microporous aeration and supplying direct current to the device;

(b) subjecting the organic wastewater and the particle electrode to circulating and directional flow under the action of the $O_3/O_2$ mixture, and subjecting the organic wastewater to electrocatalytic ozonation reaction under the action of the particle electrode and the gas diffusion electrode for primary degradation;

(c) forming a negative pressure above the inner cylinder;

allowing the organic wastewater to pass through the cylindrical water-permeable separator and the cylindrical porous $Ti/PANI/PbO_2$ membrane electrode; and subjecting the organic wastewater to oxidation with a hydroxyl radical generated by electrolysis of the cylindrical porous $Ti/PANI/PbO_2$ membrane electrode for secondary degradation; and (d) allowing the organic wastewater flowing out from the fluidized bed reactor to enter the gas-liquid separator, and collecting water discharged from the bottom of the gas-liquid separator; and collecting, by the second ozone collector, a overflowing gas through the third delivery pipe.

In an embodiment, a current density of the direct current is 5-40 mA/cm$^2$.

In an embodiment, the $O_3/O_2$ mixture comprises 5-15% by volume of $O_3$; and a concentration of the $O_3$ in the organic wastewater is 10-200 mg/L.

In an embodiment, a residence time of the organic wastewater in the fluidized bed reactor is 0.5-4 h.

Compared to the prior art, the present disclosure has the following beneficial effects.

1. Different from the traditional internally-circulating fluidized bed reactor, the novel three-dimensional electrode-ozone oxidation-electrocatalytic membrane coupled fluidized bed reactor provided herein enables the effective utilization of the $O_3$ and $O_2$ dissolved in the wastewater, thereby improving the utilization rate of the $O_3$ and $O_2$. In addition, the fluidized bed reactor in the present disclosure has an excellent mass transfer performance, a fast circulation flow rate, a simple structure and less space occupation.

2. A fiber ball filter is provided at a lower end of the internally-circulating fluidized bed reactor, which can trap those tiny suspended matters that are not easy to be precipitated and removed. In view of this, the device provided herein can also be used for the advanced degradation of biochemical tail water.

3. Through the coupling of the three-dimensional electrode-ozone oxidation and the electrocatalytic membrane, the mineralization efficiency and advanced degradation effect of the organic pollutants are greatly enhanced.

4. The intermediate cylinder used in the device provided herein is a gas diffusion electrode containing a $Fe_3O_4$-doped active carbon with a large specific surface area and acetylene black in a weight ratio of (77-82):(7-12), and through the combination with PTFE, the in-situ generation of $H_2O_2$ on the electrode surface is significantly enhanced. In addition, the addition of $Fe_3O_4$ can also promote the in-situ catalytic decomposition of $H_2O_2$ to generate a large number of hydroxyl radicals, accelerating the degradation of the organic pollutants.

5. By means of the gas-liquid distribution plate (as shown in FIG. 2) and the fiber ball filter with a specific porosity and filtration rate, the even distribution of the $O_3/O_2$ mixture and the organic wastewater entering the intermediate cylinder and the outer cylinder is enabled, and the contact time and degradation efficiency are optimized. The filling factor of the particle electrode in the cavity is further investigated. It is demonstrated that under the filling factor disclosed herein, the particle electrode can not only exhibit excellent catalysis effect, but also increase the travelling distance of the $O_3/O_2$ mixture and the organic wastewater in the fluidized bed reactor, thereby increasing the utilization rate, dissolution rate and residence time of the $O_3/O_2$ mixture.

6. A $Ti/PANI/PbO_2$ membrane electrode is adopted as the electrocatalytic membrane in the inner cylinder. The introduction of a PANI transition layer improves an oxygen evolution potential of the $Ti/PbO_2$ electrode, suppressing the occurrence of the oxygen evolution side reaction and increasing the utilization rate of the hydroxyl radicals on the surface of the $Ti/PbO_2$ electrode during the reaction. The presence of the $\alpha$-$PbO_2$ intermediate layer reduces an internal stress of the $Ti/PbO_2$ electrode, which is beneficial to prolong the service life of the $Ti/PbO_2$ electrode.

7. Structural optimization has been made to the fluidized bed reactor to break through the limitation of hydrodynamic behavior to strengthen the mass transfer of the electrocatalysis-ozonation coupling technology. Simultaneously, the addition of the three-dimensional particle electrode capable of electro-catalyzing the reduction of $O_2$ to produce $H_2O_2$ and catalyzing the ozonation promote the generation of the hydroxyl radicals. In addition, since the membrane filtration can improve the contact of pollutants in the wastewater with the strong oxidizing substances produced by the anode, the combination of the electrocatalytic oxidation and membrane filtration can further strengthen the treatment effect.

Figure 1:
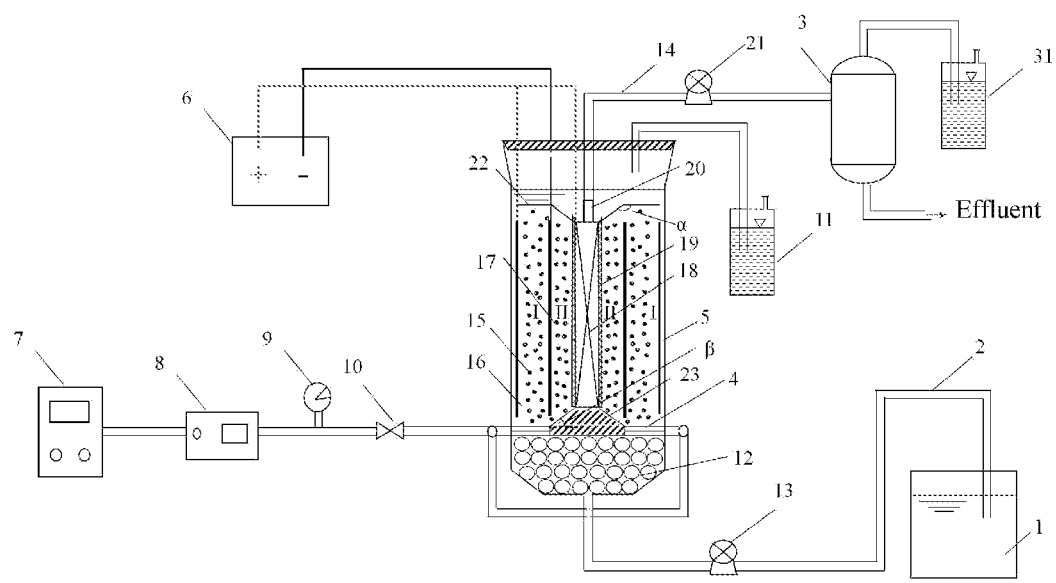
FIG. 1 schematically illustrates a structure of a device for advanced degradation of organic wastewater according to an embodiment of the present disclosure.
Figure 2:
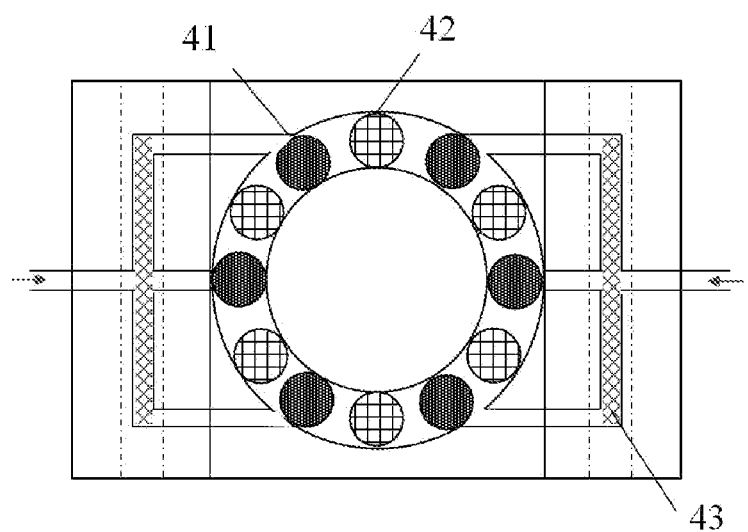
FIG. 2 schematically depicts a structure of a gas-liquid distribution plate according to an embodiment of the present disclosure.
Figure 3:
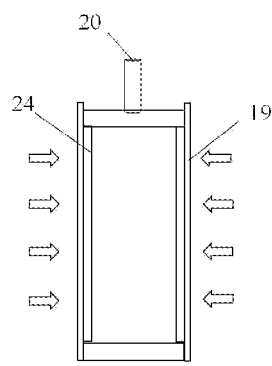
FIG. 3 schematically depicts a structure of a cylindrical electrocatalytic membrane assembly according to an embodiment of the present disclosure.

In the drawings: 1, water inlet tank; 2, inlet pipe; 3, gas-liquid separator; 4, gas-liquid distribution plate; 5, fluidized bed reactor; 6, power supply; 7, ozone generator; 8, ozone detector; 9, gas flow meter; 10, valve; 11, first ozone collector; 12, fiber ball filter; 13, inlet pump; 14, outlet pipe; 15, particle electrode; 16, outer cylinder; 17, intermediate cylinder; 18, inner cylinder; 19, cylindrical water-permeable separator; 20, water outlet; 21, outlet pump; 22, funnel-shaped internal; 23, truncated cone; 24, cylindrical porous Ti/PANI/PbO$_2$ membrane electrode; 31, second ozone collector; 41, gas channel; 42, liquid channel; 43, gas distributor; α, horizontal inclination angle of the funnel-shaped internal; β, horizontal inclination angle of the truncated cone; I, cavity formed between the intermediate cylinder and the outer cylinder (flow upwards); and II, cavity between the intermediate cylinder and the inner cylinder (flow downwards).

DETAILED DESCRIPTION OF EMBODIMENTS

The disclosure will be described completely and clearly below with reference to the accompanying drawings and embodiments to make the object, technical solutions, and beneficial effects of the present disclosure clearer.

The organic wastewater is treated using the device illustrated in FIG. 1, and the specific process is described as follows.

(a) The organic wastewater is allowed to flow through a water inlet tank 1, an inlet pipe 2 and an inlet pump 13 to enter a fluidized bed reactor 5 from its bottom. The organic wastewater is filtered by a fiber ball filter 12, and enters a cavity I and a cavity II through a plurality of liquid channels 42 of a gas-liquid distribution plate 4, where the cavity I and the cavity II are both provided with a particle electrode 15.

(b) Meanwhile, an O$_3$/O$_2$ mixture generated by an ozone generator 7 passes through an ozone detector 8, a gas flow meter 9 and a valve 10 in sequence, and then passes through a gas distributor 43 and a plurality of gas channels 41 of the gas-liquid distribution plate 4 to enter the cavity I and the cavity II. A top of the fluidized bed reactor 5 is connected to a first ozone collector 11 through a pipeline, and at the same time, the device is connected to direct current. An intermediate cylinder 17 (gas diffusion electrode) is connected to a negative electrode of a power supply 6, and an outer cylinder 16 (stainless-steel mesh) and an inner cylinder 18 (electrocatalytic membrane assembly) are connected to a positive electrode of the power supply 6. A top of the inner cylinder 18 is connected with a water outlet 20.

(c) The organic wastewater and the particle electrode 15 are subjected to circulating and directional flow under the action of the O$_3$/O$_2$ mixture, and the organic wastewater undergoes an electrocatalytic ozonation reaction under the action of the particle electrode 15 and the gas diffusion electrode to complete the primary degradation and mineralization of the organic wastewater.

(d) A negative pressure is formed above the inner cylinder 18 through an outlet pump 21 to allow the organic wastewater to sequentially pass through a cylindrical water-permeable separator 19 and the cylindrical porous Ti/PANI/PbO$_2$ membrane electrode 24. When passing through the cylindrical porous Ti/PANI/PbO$_2$ membrane electrode 24, the organic wastewater will undergo an oxidation reaction with a hydroxyl radical generated by the cylindrical porous Ti/PANI/PbO$_2$ membrane electrode 24 under the electrolysis to further degrade and mineralize the wastewater.

(e) The organic wastewater flowing out of the fluidized bed reactor 5 flows the outlet pipe 14 and the outlet pump 21 in sequence to enter a gas-liquid separator 3. The gas overflowing from the fluidized bed reactor 5 and the gas-liquid separator 3 is recovered by a second ozone collector 31 through a gas pipe. The treated water can be discharged from a bottom of the gas-liquid separator 3.

EXAMPLE 1

1.1 Provided herein was a method for preparing the gas diffusion electrode, which was specifically described as follows.

(a) A cylindrical stainless-steel substrate (a diameter of the cylinder was 6.5 cm, a height was 25 cm) was soaked in a NaOH solution with a mass fraction of 40% for 30 min, and rinsed with deionized water. Then the cylindrical stainless-steel substrate was soaked in a H$_2$SO$_4$ solution with a mass fraction of 20% at 60° C. for 20 min, and rinsed with deionized water. Finally, the cylindrical stainless-steel substrate was etched in an oxalic acid solution with a mass fraction of 20% at 90° C. for 2 h.

(b) A desired amount of the Fe$_3$O$_4$-doped active carbon and the acetylene black were blended into a beaker, added with a small amount of absolute ethanol and ultrasonically stirred to disperse evenly, and added with a desired amount of 60% poly tetra fluoroethylene (PTFE) emulsion to form an agglomerated paste and continuously stirred in a constant temperature bath at 80° C. Finally, the agglomerated paste was rolled into two sheets with a thickness of 0.4-0.8 mm by a laminator. In which, a weight ratio of the Fe$_3$O$_4$-doped active carbon to the acetylene black to the PTFE was 79.2:8.8:12.

(c) The two sheets were attached on an inner side and an outer side of the cylindrical stainless-steel substrate, respectively, and a press with a certain pressure was used to control the two sheets attached on the stainless-steel substrate, and dried in a drying cabinet at 100° C. for 1 h and calcinated in a muffle furnace at a desired temperature for 1 h. Finally, the gas diffusion electrode was soaked in acetone for 24 h to remove the residual ethanol and organic impurities on a surface of the gas diffusion electrode, and rinsed repeatedly with deionized water and dried for later use.

1.2 Provided herein was a method for preparing the cylindrical porous Ti/PANI/PbO$_2$ membrane electrode, which was specifically described as follows.

(a) A cylindrical Ti substrate (a diameter of the cylinder was 4 cm, a height was 25 cm, and a pore size was 100 meshes) was cut, ground, polished, degreased with a NaOH solution, and etched with an oxalic acid solution to obtain a porous Ti substrate.

(b) An aniline-sulfuric acid solution contained 0.1 mol/L aniline and 0.5 mol/L sulfuric acid, and nitrogen was introduced into the solution for 20 min under a dark condition to remove the dissolved oxygen in the solution. Deposition was performed in the aniline-sulfuric acid solution at a constant voltage of 15 V for 30 min with a titanium sheet as cathode and the porous Ti substrate as anode to obtain a Ti/PANI electrode.

(c) Electrodeposition was performed in an alkaline electroplating solution at a temperature of 60° C. and a constant current of 5 mA/cm$^2$ for 1 h with the Ti/PANI electrode as anode and the titanium sheet as cathode to obtain an α-PbO$_2$ intermediate layer, so as to obtain a Ti/PANI/α-PbO$_2$ electrode. The alkaline electroplating solution contains 0.1 mol/L PbO, 5 mol/L NaOH and water.

(d) Electrodeposition was performed in an acidic electrolyte solution at a temperature of 80° C. and a current density of 50 mA/cm$^2$ for 30 min with the Ti/PANI/α-PbO$_2$ electrode as anode and the titanium sheet as cathode to deposit a β-PbO$_2$ active layer, so as to obtain the cylindrical porous Ti/PANI/PbO$_2$ membrane electrode. The acid electroplating solution was prepared by adjusting a mixture containing 0.5 mol/L Pb(NO$_3$)$_2$, 0.01 mol/L KF.2H$_2$O, 4 mL/L of 60 wt % PTFE emulsion and water to pH 1.8 with nitric acid.

1.3 Provided herein was a device for advanced degradation of organic wastewater based on an internally-circulating fluidized bed, which was specifically described as follows.

The gas diffusion electrode was fabricated as above and had a thickness of 1.5 mm; the Ti/PANI/PbO$_2$ membrane electrode was prepared as above and had a thickness of 1 mm; the cylindrical stainless-steel mesh had a thickness of 1 mm, a height of 25 cm, and an inner diameter of 9 cm; the particle electrode was active carbon particles with an average particle size of 3 mm, and a filling factor of 20%. A distance from a bottom of a funnel-shaped internal 22 to a top of the upward-flow area was 3 cm, and a horizontal inclination angle of the funnel-shaped internal 22 was 135°. A height of a truncated cone 23 was 3 cm, and a horizontal inclination angle of the truncated cone 23 was 30°.

EXAMPLE 2

A typical antibiotic levofloxacin simulated wastewater was treated by the device in Example 1. The experimental parameters were set as follows: a reaction volume was 2.4 L; an initial concentration of levofloxacin in the influent was 200 mg/L; an initial pH of the solution was 7.0; an O$_3$ concentration in the inlet gas was about 15 mg/L; a gas flow rate was 0.5 L/min; a current density was 10 mA/cm$^2$; and a concentration of Na$_2$SO$_4$ (as electrolyte) was 0.05 mol/L. The device was set to operate in continuous flow operation mode. An electrochemical membrane assembly was operated at a flux of 75 L/(m$^2$·h), and the hydraulic retention time was 1 h. In the reaction time of 1 h, the pollutant of levofloxacin was completely removed, and a total organic carbon (TOC) removal rate was 68.3%.

Comparative Example 1

The device adopted herein was basically the same as that in Example 1 except that in this example, the fluidized bed reactor was free of the particle electrode, and the experimental conditions were the same as those in Example 2. The results showed that the pollutant levofloxacin in the device was completely removed within 1 h, and a TOC removal rate was 52.6%.

Comparative Example 2

The device adopted herein was basically the same as that in Example 1 except that in this example, the fluidized bed reactor was free of the current, and the experimental conditions were the same as those in Example 2. The results showed that the pollutant of levofloxacin in the device was completely removed within 1 h, and a TOC removal rate was 31.3%.

Comparative Example 3

The device adopted herein was basically the same as that in Example 1 except that in this example, the fluidized bed reactor was free of O$_3$, and the experimental conditions were the same as those in Example 2. The results showed that a levofloxacin removal rate in the device was 58.5% within 1 h, and a TOC removal rate was 18.5%.

Comparative Example 4

The device adopted herein was basically the same as that in Example 1 except that in this example, a weight ratio of Fe$_3$O$_4$-doped active carbon to acetylene black to PTFE used in the paste in the cylindrical gas diffusion electrode was 88:5:7, and the experimental conditions were the same as those in Example 2. The results showed that the pollutant of levofloxacin in the device was completely removed within 1 h, and a TOC removal rate was 51.4%.

Comparative Example 5

The device adopted herein was basically the same as that in Example 1 except that in this example, in the preparation method of the Ti/PANI/PbO$_2$ membrane electrode, the aniline concentration in the aniline sulfuric acid solution was 0.3 mol/L, the deposition time was 10 min, and the experimental conditions were the same as those in Example 2. Provided herein was a method for preparing the cylindrical porous Ti/PANI/PbO$_2$ membrane electrode in this comparative example, which was specifically described as follows.

(a) A cylindrical Ti substrate (a diameter of the cylinder was 4 cm, a height was 25 cm, and a net hole is a diamond mesh with a size of 2 mm×4 mm) was cut, ground, polished, degreased with a NaOH solution, and etched with an oxalic acid solution to obtain a porous Ti substrate.

(b) An aniline-sulfuric acid solution contained 0.3 mol/L aniline and 0.5 mol/L sulfuric acid, and the nitrogen was introduced into the solution for 20 min under a dark condition to remove the dissolved oxygen in the solution. Deposition was performed in the aniline-sulfuric acid solution at a constant voltage of 15 V for 10 min with a titanium sheet as cathode and the porous Ti substrate as anode to obtain a Ti/PANI electrode.

(c) Electrodeposition was performed in an alkaline electrolyte solution at a temperature of 60° C. and a current density of 5 mA/cm$^2$ for 1 h with the Ti/PANI electrode as anode and the titanium sheet as cathode to deposit an α-PbO$_2$ intermediate layer, so as to obtain a Ti/PANI/α-PbO$_2$ electrode. The alkaline electroplating solution contained 0.1 mol/L PbO, 5 mol/L NaOH and water.

(d) Electrodeposition was performed in an acidic electrolyte solution at a temperature of 80° C. and a current density of 50 mA/cm$^2$ for 2 h with the Ti/PANI/α-PbO$_2$ electrode as anode and the titanium sheet as cathode to deposit a β-PbO$_2$ active layer, so as to obtain the cylindrical porous Ti/PANI/PbO$_2$ membrane electrode. The acid electroplating solution was prepared by adjusting a mixture containing 0.5 mol/L Pb(NO$_3$)$_2$, 0.01 mol/L KF.2H$_2$O, 4 mL/L of 60 wt % PTFE emulsion and water to pH 1.8 with nitric acid.

The results showed that the pollutant of levofloxacin in the device was completely removed within 1 h, and a TOC removal rate was 48.1%.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A device for advanced degradation of organic wastewater, comprising:
   a fluidized bed reactor;
   wherein the fluidized bed reactor is a cylindrical internally-circulating fluidized bed reactor; an interior of the fluidized bed reactor comprises a funnel-shaped internal, a truncated cone, a fiber ball filter, a gas-liquid distribution plate, an inner cylinder, an intermediate cylinder and an outer cylinder; and the inner cylinder, the intermediate cylinder and the outer cylinder are coaxial;
   the intermediate cylinder is sleeved outside the inner cylinder, and the outer cylinder is sleeved outside the intermediate cylinder; the inner cylinder is an electrocatalytic membrane assembly; the intermediate cylinder is a gas diffusion electrode; the outer cylinder is a stainless-steel mesh; a first cavity is formed between the intermediate cylinder and the outer cylinder; a second cavity is formed between the intermediate cylinder and the inner cylinder; the first cavity and the second cavity are filled with a particle electrode; the intermediate cylinder is connected to a negative electrode; the inner cylinder and the outer cylinder are connected to a positive electrode; the intermediate cylinder and the outer cylinder are of equal length; tops of the inner cylinder, the intermediate cylinder and the outer cylinder are the same in height; bottoms of the intermediate cylinder and the outer cylinder are 1-3 cm lower than a bottom of the inner cylinder; and the outer cylinder is close to an outer wall of the fluidized bed reactor;
   the fiber ball filter is arranged at a bottom of the fluidized bed reactor; the gas-liquid distribution plate is arranged on a top of the fiber ball filter; the inner cylinder, the intermediate cylinder and the outer cylinder are arranged at a top of the gas-liquid distribution plate; and the organic wastewater is allowed to flow through the fiber ball filter, the gas-liquid distribution plate, the first cavity, the second cavity and the inner cylinder sequentially to be discharged;
   the funnel-shaped internal is arranged at the tops of the inner cylinder, the intermediate cylinder and the outer cylinder; a diameter of a lower orifice of the funnel-shaped internal is equal to a cross-sectional diameter of the inner cylinder; a ring width of a ring-shaped top of the funnel-shaped internal is equal to a distance between the intermediate cylinder and the outer cylinder; a vertical distance between the top of the funnel-shaped internal and tops of the intermediate cylinder and the outer cylinder is 3-6 cm; a horizontal inclination angle α of the funnel-shaped internal is 120-150°; and the funnel-shaped internal is configured such that after entering the first cavity and flowing upward to reach the funnel-shaped internal, the organic wastewater is allowed to flow downward to enter the second cavity to form a circulating flow;
   the truncated cone is arranged at bottoms of the inner cylinder, the intermediate cylinder and the outer cylinder; an upper surface of the truncated cone is connected with the bottom of the inner cylinder, and is the same with the bottom of the inner cylinder in area; a boundary of the upper surface of the truncated cone is vertically aligned with a boundary of the bottom of the inner cylinder; a lower surface of the truncated cone is the same with a bottom of the intermediate cylinder in area, and a boundary of the lower surface of the truncated cone is vertically aligned with a boundary of the bottom of the intermediate cylinder; the gas-liquid distribution plate is provided at an outer side of a bottom of the truncated cone; and the truncated cone is configured such that after passing through fiber ball filter, the organic wastewater is allowed to enter the outer cylinder and the intermediate cylinder through the gas-liquid distribution plate; and
   the gas-liquid distribution plate comprises a gas distributor, a plurality of gas channels and a plurality of liquid channels; the plurality of gas channels and the plurality of liquid channels are alternately arranged; the gas distributor is communicated with the plurality of gas channels; and the gas distributor is configured for distributing a gas flowing toward the outer cylinder and the intermediate cylinder evenly with an $O_3/O_2$ mixture.

2. The device of claim 1, wherein each of the plurality of gas channels is provided with a microporous aeration plate; each of the plurality of liquid channels is provided with a water distributing plate with a pore size of 0.1-0.5 mm.

3. The device of claim 1, wherein the intermediate cylinder and the outer cylinder both have a length of 20-40 cm; and a distance between the positive electrode and the negative electrode is 3-6 cm.

4. The device of claim 1, wherein the gas diffusion electrode is composed of a $Fe_3O_4$-doped active carbon, acetylene black and poly tetra fluoroethylene (PTFE); and a weight ratio of the $Fe_3O_4$-doped active carbon to the acetylene black to the PTFE is (77-82):(7-12):(9-15).

5. The device of claim 1, wherein a top of the inner cylinder is connected with a water outlet; the inner cylinder comprises a cylindrical water-permeable separator and a cylindrical porous Ti/polyaniline (PANI)/$PbO_2$ membrane electrode; wherein the cylindrical water-permeable separator is wrapped around the cylindrical porous Ti/PANI/$PbO_2$ membrane electrode.

6. The device of claim 5, wherein the cylindrical water-permeable separator has a pore size of 0.1-0.5 mm; a lower end of the cylindrical water-permeable separator is flush with a lower end of the cylindrical porous Ti/PANI/$PbO_2$ membrane electrode; an upper end of the cylindrical water-permeable separator is higher than an upper end of the cylindrical porous Ti/PANI/$PbO_2$ membrane electrode and a lowest point of the funnel-shaped internal; and a distance between the upper end of the cylindrical water-permeable separator and the lowest point of the funnel-shaped internal is less than 1 cm.

7. The device of claim 5, wherein the cylindrical porous Ti/PANI/$PbO_2$ membrane electrode comprises a porous Ti substrate, a polyaniline membrane transition layer, an α-$PbO_2$ intermediate layer and a β-$PbO_2$ active layer.

8. The device of claim 7, wherein the cylindrical porous Ti/PANI/$PbO_2$ membrane electrode is prepared through steps of:

(a) cutting a cylindrical Ti substrate followed by grinding, polishing, degreasing with a NaOH solution, and etching with an oxalic acid solution to obtain the porous Ti substrate;
(b) performing deposition in an aniline-sulfuric acid solution at a constant voltage of 15-20 V for 15-45 min with the porous Ti substrate as anode and a titanium sheet as cathode to obtain a Ti/PANI electrode; wherein the aniline-sulfuric acid solution contains 0.1 mol/L aniline and 0.5 mol/L sulfuric acid;
(c) performing electrodeposition in an alkaline electroplating solution at a temperature of 50-65° C. and a current density of 3-5 mA/cm$^2$ for 0.5-2 h with the Ti/PANI electrode as anode and the titanium sheet as cathode to deposit the α-PbO$_2$ intermediate layer, so as to obtain a Ti/PANI/α-PbO$_2$ electrode; wherein the alkaline electroplating solution contains 0.1 mol/L PbO, 4-5 mol/L NaOH and water; and
(d) performing electrodeposition in an acidic electroplating solution at a temperature of 50-90° C. and a current density of 10-80 mA/cm$^2$ for 0.5-1 h with the Ti/PANI/α-PbO$_2$ electrode as anode and the titanium sheet as cathode to deposit the β-PbO$_2$ active layer, so as to obtain the cylindrical porous Ti/PANI/PbO$_2$ membrane electrode; wherein the acid electroplating solution is prepared by adjusting a mixture containing 0.3-0.5 mol/L Pb(NO$_3$)$_2$, 0.01-0.02 mol/L KF.2H$_2$O, 4-5 mL/L of 60 wt % PTFE emulsion and water to pH 1.5-2.0 with nitric acid.

9. The device of claim 7, wherein the porous Ti substrate is a tubular porous Ti substrate with a pore size of 100 μm-1 mm.

10. The device of claim 1, wherein the particle electrode is active carbon, graphite particle or super carbon black particle with an average particle size of 2-4 mm.

11. The device of claim 1, wherein a filling factor of the particle electrode in the fluidized bed reactor is 10-50%.

12. The device of claim 1, wherein the fiber ball filter has a filtration rate of 0.5-2 cm/s, a specific surface area of greater than or equal to 2000 m$^2$/m$^3$, and a porosity of greater than or equal to 90%.

13. The device of claim 1, wherein the truncated cone has a height of 3-6 cm, and a horizontal inclination angle β of 30-45°.

14. The device of claim 1, further comprising:
an inlet pipe;
an inlet pump;
a gas-liquid separator;
an ozone generator;
a first ozone collector;
a second ozone collector;
an outlet pump;
an outlet pipe;
an ozone detector;
a gas flow meter; and
a valve;
wherein the ozone generator, the ozone detector, the gas flow meter, the valve and the gas-liquid distribution plate are connected in sequence; the inlet pipe is connected to the inlet pump; the inlet pump is connected to the bottom of the fluidized bed reactor through a first delivery pipe; a first end of the outlet pipe is communicated with the inner cylinder, and a second end of the outlet pipe is connected with the outlet pump; the outlet pump is communicated with the gas-liquid separator through a second delivery pipe; a top of the gas-liquid separator is connected with the second ozone collector through a third delivery pipe; and a bottom of the gas-liquid separator is provided with a water outlet.

15. A method for advanced treatment of organic wastewater using the device of claim 1, comprising:
(a) filtering, by the fiber ball filter, the organic wastewater followed by delivery to the fluidized bed reactor through the plurality of liquid channels; feeding the O$_3$/O$_2$ mixture to the fluidized bed reactor through the plurality of gas channels by bottom microporous aeration and supplying direct current to the device;
(b) subjecting the organic wastewater and the particle electrode to circulating and directional flow under the action of the O$_3$/O$_2$ mixture, and subjecting the organic wastewater to an electrocatalytic ozonation reaction under the action of the particle electrode and the gas diffusion electrode for primary degradation;
(c) forming a negative pressure above the inner cylinder; allowing the organic wastewater to pass through the cylindrical water-permeable separator and the cylindrical porous Ti/PANI/PbO$_2$ membrane electrode; and subjecting the organic wastewater to oxidation with a hydroxyl radical generated by electrolysis of the cylindrical porous Ti/PANI/PbO$_2$ membrane electrode for secondary degradation; and
(d) allowing the organic wastewater flowing out from the fluidized bed reactor to enter the gas-liquid separator, and collecting water discharged from the bottom of the gas-liquid separator.

16. The method of claim 15, wherein a current density of the direct current is 5-40 mA/cm$^2$.

17. The method of claim 15, wherein the O$_3$/O$_2$ mixture comprises 5-15% by volume of O$_3$; and a concentration of the O$_3$ in the organic wastewater is 10-200 mg/L.

18. The method of claim 15, wherein a residence time of the organic wastewater in the fluidized bed reactor is 0.5-4 h.

* * * * *